United States Patent
Al Shehri et al.

(10) Patent No.: US 10,557,698 B2
(45) Date of Patent: Feb. 11, 2020

(54) FLEXIBLE STRAP ANTENNA ARRAYS FOR TANK VOLUME CALIBRATION AND RESONANCE FREQUENCY SHIFT MEASURING METHODS USING SAME

(71) Applicant: Saudi Arabian Oil Company, Dhahran (SA)

(72) Inventors: Ali Al Shehri, Thuwal (SA); Brian Parrott, Thuwal (SA); Ayman Amer, Thuwal (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 15/826,908

(22) Filed: Nov. 30, 2017

(65) Prior Publication Data
US 2019/0162517 A1     May 30, 2019

(51) Int. Cl.
*G01R 31/00*     (2006.01)
*G01B 7/16*     (2006.01)
(Continued)

(52) U.S. Cl.
CPC .............. *G01B 7/16* (2013.01); *G01B 3/1002* (2013.01); *G01B 5/0021* (2013.01); *G01B 5/025* (2013.01);
(Continued)

(58) Field of Classification Search
CPC ........ H01Q 21/24; H01Q 21/061; H01Q 1/38; H01Q 21/065; H01Q 21/064; H01Q 9/045;
(Continued)

(56) References Cited

U.S. PATENT DOCUMENTS 5,923,289 A * 7/1999 Buer .................... H01Q 3/2605
                                                                 342/368
7,696,928 B2     4/2010     Rowell
(Continued)

FOREIGN PATENT DOCUMENTS

GB          2432146 A     5/2007

OTHER PUBLICATIONS

International Search Report and Written Opinion in corresponding PCT Application No. PCT/US2018/063015, dated February 27, 2019.

*Primary Examiner* — Vinh P Nguyen
(74) *Attorney, Agent, or Firm* — Leason Ellis LLP

(57) ABSTRACT

A system and method is disclosed for measuring the dimensions of physical objects. The systems and methods include a measuring instrument of significant length comprising an array of patch antennas arranged along the length of an elongate substrate such that the antenna array expands and contracts with the substrate. The system also includes a diagnostic computing device for measuring the array's electrical properties including resonance frequency and changes in said properties relative to reference electrical properties that correspond to a reference length of the array and substrate. Accordingly, based on the measured changes in electrical properties and the reference length, the diagnostic system can calculate the current length of the measuring instrument. Accordingly, the disclosed systems and methods can provide self-calibrating measuring systems and measuring systems capable of being deployed onto a structure for periodically calibrating the structure's dimensions as it expands or contracts during operation.

16 Claims, 9 Drawing Sheets

(51) Int. Cl.
*G01F 17/00* (2006.01)
*H01Q 9/04* (2006.01)
*H01Q 21/08* (2006.01)
*G01B 7/02* (2006.01)
*G01B 15/06* (2006.01)
*G01B 3/10* (2006.01)
*G01B 5/02* (2006.01)
*H01Q 21/06* (2006.01)
*H01Q 21/00* (2006.01)
*G01B 5/00* (2006.01)

(52) U.S. Cl.
CPC ............... *G01B 7/02* (2013.01); *G01B 15/06* (2013.01); *G01F 17/00* (2013.01); *H01Q 9/045* (2013.01); *H01Q 21/0075* (2013.01); *H01Q 21/065* (2013.01); *H01Q 21/08* (2013.01)

(58) Field of Classification Search
CPC .. H01Q 9/0421; H01Q 9/285; H01Q 21/0006; H01Q 21/26; H01Q 9/0407; H01Q 9/0414; H01Q 9/0457; H01Q 9/30; H01Q 21/0031; H01Q 21/0037; H01Q 21/005; H01Q 21/0068; H01Q 21/0075; H01Q 21/06; H01Q 21/20; H01Q 21/205; H01Q 21/22; H01Q 21/29; H01Q 9/04; H01Q 9/0478; H01Q 9/16; H01Q 9/28; H01Q 9/32; H01Q 21/08; G01R 33/3415; G01R 27/28; G01R 27/32; G01R 33/3678; G01R 27/02; G01R 31/2822; G01R 33/0354; G01R 33/34; G01R 33/34084; G01R 33/3657; G01R 35/005; G01B 7/16; G01B 15/06; G01B 5/0021; G01B 5/025; G01B 7/02; G01B 3/1002; G01F 17/00

See application file for complete search history.

(56) References Cited

U.S. PATENT DOCUMENTS

| | | | |
|---|---|---|---|
| 8,952,863 | B2 | 2/2015 | Haque et al. |
| 10,141,646 | B2 * | 11/2018 | Shiozaki ................. H01Q 7/00 |
| 2005/0235482 | A1 | 10/2005 | Deaett et al. |
| 2009/0219213 | A1 * | 9/2009 | Lee .......................... H01P 3/00 343/700 MS |
| 2009/0309804 | A1 * | 12/2009 | Chen .................. H01Q 21/0075 343/893 |
| 2011/0025577 | A1 | 2/2011 | Ward et al. |
| 2011/0040498 | A1 | 2/2011 | Huang et al. |
| 2011/0260946 | A1 * | 10/2011 | Dandekar .............. H01Q 9/045 343/893 |
| 2017/0115171 | A1 | 4/2017 | Huang et al. |
| 2017/0131334 | A1 * | 5/2017 | Ramzan ................. G01N 22/00 |
| 2017/0172439 | A1 | 6/2017 | Zhu et al. |

* cited by examiner

FLEXIBLE STRAP ANTENNA ARRAYS FOR TANK VOLUME CALIBRATION AND RESONANCE FREQUENCY SHIFT MEASURING METHODS USING SAME

FIELD OF THE INVENTION

The present invention relates to measuring instruments, and, more particularly, elongate measuring instruments that include flexible strap antenna arrays which have a resonance frequency that shifts due to physical expansion and contraction of the antenna array. The present invention also relates to methods for calibrating the length of such elongate measuring instruments and measuring the size of objects using such elongate measuring instruments and, more particularly, calibrating the volume of storage tanks.

BACKGROUND

In the oil and gas industry the storage tanks for crude and refined products play a key part in the supply chain of hydrocarbons. Knowing the exact volume of these storage units plays a critical role when transferring products to and/or from the tanks. As a result of variations in external and internal conditions (i.e. temperature) and aging and also as a result of the weight of the liquid product (i.e. hydrostatic pressure), the tank volume can vary by as much as +/−0.2%. Considering a 250,000 barrel storage tank, this variation would result in a volume of +/−500 barrels in volume change.

As a result of the high value of petroleum hydrocarbons, there is a mandatory requirement for calibration of storage tanks. Tanks used for custody transfer must be calibrated such that the transferred volume is very accurately known (eg. Less than 0.1% error). The most commonly used techniques to perform this are; manual strapping (API MPMS 2.2A), optical techniques (Optical Reference Line Method ORLM—API Chapter 2.2B, Optical Triangulation Method (OTM)—API Chapter 2.2C, Electro-Optical Distance Ranging Method (EODR)—API Chapter 2.2D) and liquid calibrations (API Standard 2555). However, these measurements have been found to produce errors and are considered non-effective. In some cases, the foregoing testing techniques require tank downtime (e.g., emptying of the tank or otherwise halting the tank operation temporarily), which accumulates additional costs to the losses incurred. Moreover, many of the foregoing testing techniques are invasive in that they require accessing the internal volume of the tank and also can be destructive.

The existing methods for tank calibration present significant drawbacks. For instance, using the current standards, it can take 1-2 days of work to perform the calibration. As a result, calibration of storage tanks is performed infrequently thus leading to inaccurate measurements of the actual volume stored within the tank or transferred to and from the tank, which can be costly. For example, a traditional timeframe between calibrations can be between five and fifteen years.

Accurately measuring the dimensions of large structures like storage tanks can require a measuring instrument having a significant length which is known to a high degree of accuracy and which is used to measure the dimensions of the structure. However, existing measuring instruments of significant length (eg. 50 m) can experience physical expansion/contraction due to a variety of environmental factors, including, most notably, temperature. Accordingly, in order to perform highly precise measurements with such instruments, these measuring devices can require periodic calibration. In addition, the physical expansion/contraction of the device is often also approximated mathematically based on the environmental conditions during the instruments use.

What is needed are measuring systems and methods that addresses the limitations associated with the efficiency of performing measurements using existing systems. It is with respect to these and other considerations that the disclosure made herein is presented.

SUMMARY

According to a first aspect, a measuring system for connection to a network analyzer is disclosed. The system comprises a measuring instrument that includes a flexible elongate strap substrate having a length. The measuring instrument also includes a flexible antenna array that extends substantially along the length of the strap substrate and that can either be affixed to a surface of the strap substrate or embedded within the strap substrate whereby compression or extension of the strap substrate causes compression or extension of the antenna array.

More specifically, the antenna array comprises a plurality of interconnected patch antennas arranged in at least one row and that are electrically connected to a feeding line that extends alongside the at least one row. In addition, the feeding line is configured to terminate in an impedance matched to the network analyzer such that the network analyzer can excite the antenna array with an input signal and measure electrical parameters relating to the antenna array's response to the input signal at a resonance frequency. Moreover, the antenna array is configured such that the measured electrical parameters vary as a function of the physical length of the antenna array during use.

According to another aspect, a system for measuring a volume of a storage container using a network analyzer is provided. The system comprises a plurality of measuring instruments configured to be deployed on an exterior wall of a cylindrical storage container wherein a given measuring instrument among the plurality of measuring instruments is extended circumferentially about the circumferential sidewall of the storage container at a respective height on the wall such that a length of the given measuring instrument corresponds to the circumference of the container at the respective height. More specifically, the given measuring instrument includes a flexible elongate strap substrate and a flexible antenna array that extends substantially along the length of the strap substrate and is either affixed to a surface of the strap substrate or embedded within the strap substrate such that compression or extension of the strap substrate causes compression or extension of the antenna array. Furthermore, the antenna array comprises a plurality of interconnected patch antennas arranged in at least one row, wherein the plurality of patch antennas are electrically connected to a feeding line extending alongside the at least one row. In addition, the feeding line is configured to terminate in an impedance matched to the network analyzer such that the network analyzer can excite the antenna array with an input signal and measure electrical parameters relating to the antenna array's response to the input signal at a resonance frequency. Moreover, the antenna array is configured such that the measured electrical parameters vary as a function of the physical length of the antenna array during use.

The system also includes a non-transitory computer readable storage medium and one or more processors that are in electronic communication with the given measuring instrument and the computer readable storage medium. In addition, one or more software modules comprising executable instructions are stored in the storage medium and are executable by the processor.

More specifically, included among the software modules is an excitation module that configures the processor to, using the network analyzer connected to the antenna array, generate the input signal to excite the antenna array. The software modules also include a parameter measurement module that configures the processor to, using the network analyzer, measure the electrical parameters relating to the antenna array's response to the input signal, and record the measured electrical parameters in the storage medium. Also included among the software modules is a parameter analysis module that configures the processor to calculate, based on the measured electrical parameters, a change in the electrical parameters relative to reference electrical parameters for the antenna array stored in the storage, wherein the reference electrical parameters for the antenna array correspond to a reference length of the antenna array and the strap substrate. Furthermore, the software modules also include a dimension analysis module that configures the processor to calculate a current length of the antenna array and the strap substrate based on the calculated change in electrical parameters and the reference length. The dimension analysis module also configures the processor to calculate the volume of the storage container based on the calculated length of the antenna array of each of the plurality of measuring instruments.

According to another aspect, a method of measuring an object using a measuring instrument is disclosed. The method includes the step of providing a measuring instrument comprising a flexible elongate strap substrate having a length and a flexible antenna array extending substantially along the length of the strap substrate. More specifically, the antenna array is affixed to a surface of the strap substrate or embedded within the strap substrate, whereby compression or extension of the strap substrate causes compression or extension of the antenna array. Furthermore, the antenna array comprises a plurality of interconnected patch antennas arranged in at least one row, wherein the plurality of patch antennas are electrically connected to a feeding line extending alongside the at least one row, and wherein the feeding line is configured to be connected to a network analyzer. In addition, the antenna array is designed to have a reference resonance frequency that corresponds to a reference length of the antenna array and the strap substrate, and wherein the antenna array is configured such that the resonance frequency of the antenna array varies as a function of changes in the length of the antenna array.

The method also includes the step of calibrating the length of the measuring instrument. More specifically, the calibrating step includes generating, with a network analyzer connected to the antenna array, an input signal that excites the antenna array and then measuring a resonance frequency of the antenna array in response to the input signal with the network analyzer. In addition, the calibrating step also includes calculating, with a diagnostic computing system, a change in the resonance frequency based on the measured resonance frequency relative to the reference resonance frequency. In particular, the reference resonance frequency and corresponding reference length of the antenna array and strap substrate are stored in a database that is accessible to the diagnostic computing system. Lastly, the calibrating step includes determining, with the diagnostic computing system, a current length of the antenna array and the strap substrate based on the measured change in resonance frequency and the reference length of the antenna array and the strap substrate.

These and other aspects, features, and advantages can be appreciated from the accompanying description of certain embodiments of the invention and the accompanying drawing figures and claims.

DETAILED DESCRIPTION OF CERTAIN EMBODIMENTS OF THE INVENTION

Figure 1:
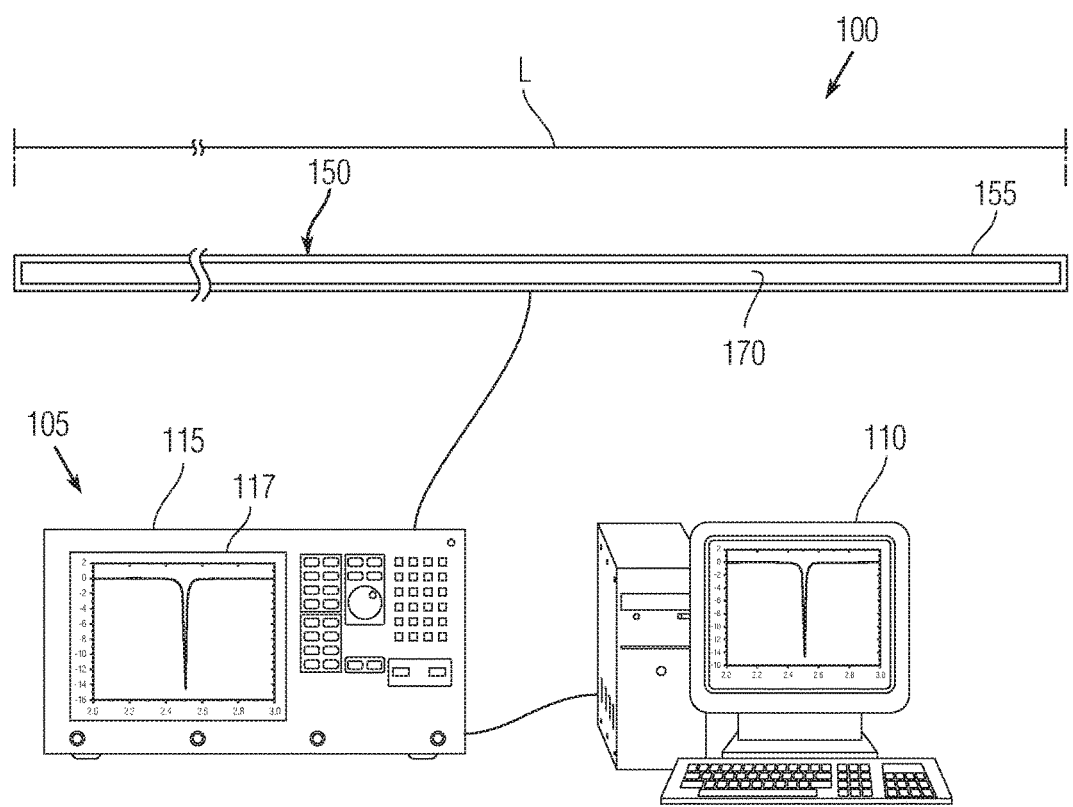
FIG. 1 is a high-level diagram illustrating an exemplary configuration of a measuring system according to an embodiment of the invention.

By way of overview and introduction, systems and methods are disclosed for measuring the dimensions of physical objects. More specifically, the systems and methods include a measuring instrument that includes an array of micro-strip or "patch" antennas distributed over the length of an elongate substrate (referred to as a "smart strap" or "measuring device") such that the antenna array is configured to expand and contract together with the substrate. In addition, the system includes a diagnostic computing device that is in communication with the antenna array and is configured to measure the electrical properties of the antenna array such as resonance frequency and return losses. Accordingly, the diagnostic system can measure changes in resonance frequency and return losses relative to baseline electrical properties for the array and calculate the antenna array's change in physical dimension (e.g., length and/or width). Thus, the corresponding change in physical dimension of the substrate can be calculated.

Accordingly, the exemplary configurations of the smart strap and analysis techniques can be configured to provide a stand-alone measuring instrument capable of accurately self-calibrating its true length based on the measured electrical properties of the antenna array. More specifically, a stand-alone measuring device can be configured to provide a self-calibrating measuring instrument of significant length (e.g., 50 m long), which can experience physical expansion/compression due to a variety of environmental factors, including, most notably, temperature and external forces on the instrument. In order to perform highly precise measurements with such instruments, the embedded patch antenna array extending substantially along the length of the measuring instrument can be utilized to calibrate the actual length of the measuring device automatically based on the direct physical expansion/contraction of the antenna array, rather than by approximating the change in length based on environmental conditions and assumed material properties (e.g., material properties of the substrate or of the structural material that the substrate is attached to).

In accordance with one or more further embodiments described herein, the exemplary smart strap devices and analysis techniques are configured to provide a system for calibrating the volume of large storage containers that are typically generally cylindrical in shape. In some exemplary configurations, the container volume calibration system comprises one or more straps arranged such that they extend around the exterior surface(s) of a storage container and are secured at respective heights from the base of the container, thereby defining an array of "smart straps." The diagnostic system can also be configured to interrogate the antenna array of each smart strap so as to enable the determination of the length or change in length of the respective smart strap. Accordingly, based on the placement of the smart straps relative to one-another and/or the measured strap lengths, the physical dimensions of the container (e.g., the circumference, volume of the container, and the like) can be accurately calculated by the diagnostic computer. Moreover, the internal volume of the container can be calibrated/measured based on the geometric measurements of the wall and other known properties of the container such as the wall thickness. In some basic configurations, the system for calibrating the volume of storage containers includes one smart strap. In more complex configurations the system includes a plurality of smart straps placed on the container at multiple levels (i.e., different heights in the vertical direction). As a result, a two-dimensional map or three dimensional map of the container can be created using principles of geometry. It should be understood that the systems and techniques disclosed herein can also be applied to calibrate the dimensions of objects having different sizes and shapes as well. For instance, the exemplary embodiments can be used to measure the length, width, diameter, volume, etc. of open or closed vessels, tanks and other such containers or conduits of various sizes.

FIG. 1 is a high-level diagram illustrating an exemplary measuring system 100 comprising a smart strap measuring device 150 and a diagnostic computing system 105. The smart strap 150 comprises an elongate substrate 155 having a length L and an antenna array 170. Preferably, the antenna array extends substantially along the length L of the substrate. As noted, the length of the substrate is significant, for example and without limitation, on the order of meters, such as 50 m, however, longer or shorter smart straps can be utilized. Preferably, both the substrate and the antenna structure are flexible so as to provide a flexible smart strap suitable for conforming to the contours of a structure being measured or, at a minimum, suitable for expanding and contracting without breaking. For example and without limitation, the bendable substrate can be made of Kapton. Furthermore, preferably, the substrate material can be chosen to have low dielectric permittivity, for instance, close to the impedance of air.

The antenna array 170 can comprise an array of microstrip antennas, which are also referred to as patch antennas. The antenna array can be provided on a surface of the substrate or embedded within the thickness of the substrate. Moreover, it should be understood that the substrate and/or the antenna array can be encapsulated within a protective material/housing for protection against harsh environments. The flexible antenna structure can be constructed using known fabrication techniques such as depositing one or more layers of conductive (e.g., metallic) materials such as copper and/or dielectric material layers on the bendable Kapton substrate, for example. The antennas defining the array can be distributed across the area of the elongate substrate in various arrangements as further described herein in connection with FIGS. 2B-2C.

As shown in FIG. 1, the smart strap and, more specifically, the one or more antenna arrays 170 can be electrically connected to a diagnostic computing system 105 that is configured to measure the electrical properties of the one or more antenna arrays and the physical dimensions of the antenna array and, thus, the substrate. In particular, the diagnostic computing system can include a network analyzer 115 that is connected to the antenna array 170 by, for example, a wired connection and a BNA connector (not shown). Furthermore, the diagnostic computing system can also comprise a control computer 110, which is a data processing apparatus capable of receiving/transmitting information to/from the network analyzer 115. In addition, the control computer can be further configured to communicate with other computing devices, store electronic information and process such information, for instance, so as to measure the length of the antenna array and smart strap, as further described herein. It should be understood that the components of the diagnostic computing system 105 (e.g., control computer 110 and network analyzer 115) can be realized as a single system or using multiple separate devices.

Network analyzers are commercially available and well known in the art. The network analyzer 115 can be of the SNA type (i.e., Scalar Network Analyzer) and/or the VNA type (i.e., Vector Network Analyzer) or other suitable network analyzer systems. SNAs typically are used to measure magnitude related measurements and VNAs typically are used to measure both phase and magnitude related measurements. The network analyzer 115 is preferably configured to excite the antenna array and measure the output signals of the antenna array. In particular, the network analyzer can measure various electrical properties of the antenna array including resonance frequency, return loss and the like through conventional connections to the antenna array. More specifically, Vector Networks Analyzers (VNA) can measure the magnitude and phase of scattering parameters (S-Parameters) which are a power matrix to quantify magnitude and phase of incident and reflected signals of a network/circuit by measuring the real and imaginary parts of associated complex numbers of propagating power signals. For power signal incident on one port, some fraction of that signal gets reflected back out of the incent port, some of it enters into the incident port then exits or scatters at some or part of the other ports (could be amplified or attenuated). For the application of antennas, return loss is one the main parameters that is measured using the VNA. It is the loss of power in the signal returned/reflected by a discontinuity circuit (antenna in this case) at the transmission feeding line. This discontinuity can be a mismatch with the termination load inserted in the line and expressed as a ratio in decibel (dB).

The physical and electrical dimensions of the antenna array are linked to each other such that changes in the physical dimension directly and sensitively effect the electrical length of the antenna array, which is perceived as changes in the resonance frequency. The antenna array can be designed, for example, to operate at a resonant frequency of 2.4 GHz, however the resonance can shift from the design frequency during use. The shift can be positive (i.e., to higher frequencies/shorter wavelengths) from the center frequency or a negative shift (i.e., to lower frequencies/longer wavelengths). The frequency shifting phenomena is dependent on the fringing fields around the antenna which have the electrical effect of making the patch appear to be shorter or longer in its dimensions. A shift in resonance frequency is strongly related with the dimension of the antenna array. Accordingly, physical changes in the dimension of the substrate, say, due to the change in length of the object the substrate is attached to, can induce a change in the physical dimensions of the antenna array and directly effect the electrical behavior (e.g., resonance frequency) of the array.

Patch antennas are classified as planar printed antennas. Among other types of antennas (such as dipole antennas), patch antennas are considered to be the most popular and adaptable antennas in many wireless communication systems and applications. This is because of many advantages associated with patch antennas, including: ease of integration with other electronic circuits, efficient radiation properties, ease of design, ease of parameter control, and low cost production and manufacturing characteristics. The name is derived from the shape of the printed antenna conductive layer. The patch can be rectangular, circular, or annular ring. By designing planar patch antennas, several undesirable features of other antennas can be avoided, such as a bulky size and incompatibility with the aerodynamics requirements of fast moving vehicles, missiles and airplanes. This makes printed planar antennas ideal for this kind of usage. Patch antennas have advantages over other antenna designs. The advantages are mainly because of its planar structure which can be easily produced using printing technologies and integrated with other circuit elements used in mobile wireless communications and cellular phones. The most important disadvantages of this type of antenna is the fact that the antenna can handle only low RF power compared to other types due to the small separation between the radiating patch and the ground plane in addition to the ohmic losses in the feeding lines. Also, patch antenna bandwidth is relatively narrow.

Figure 2:
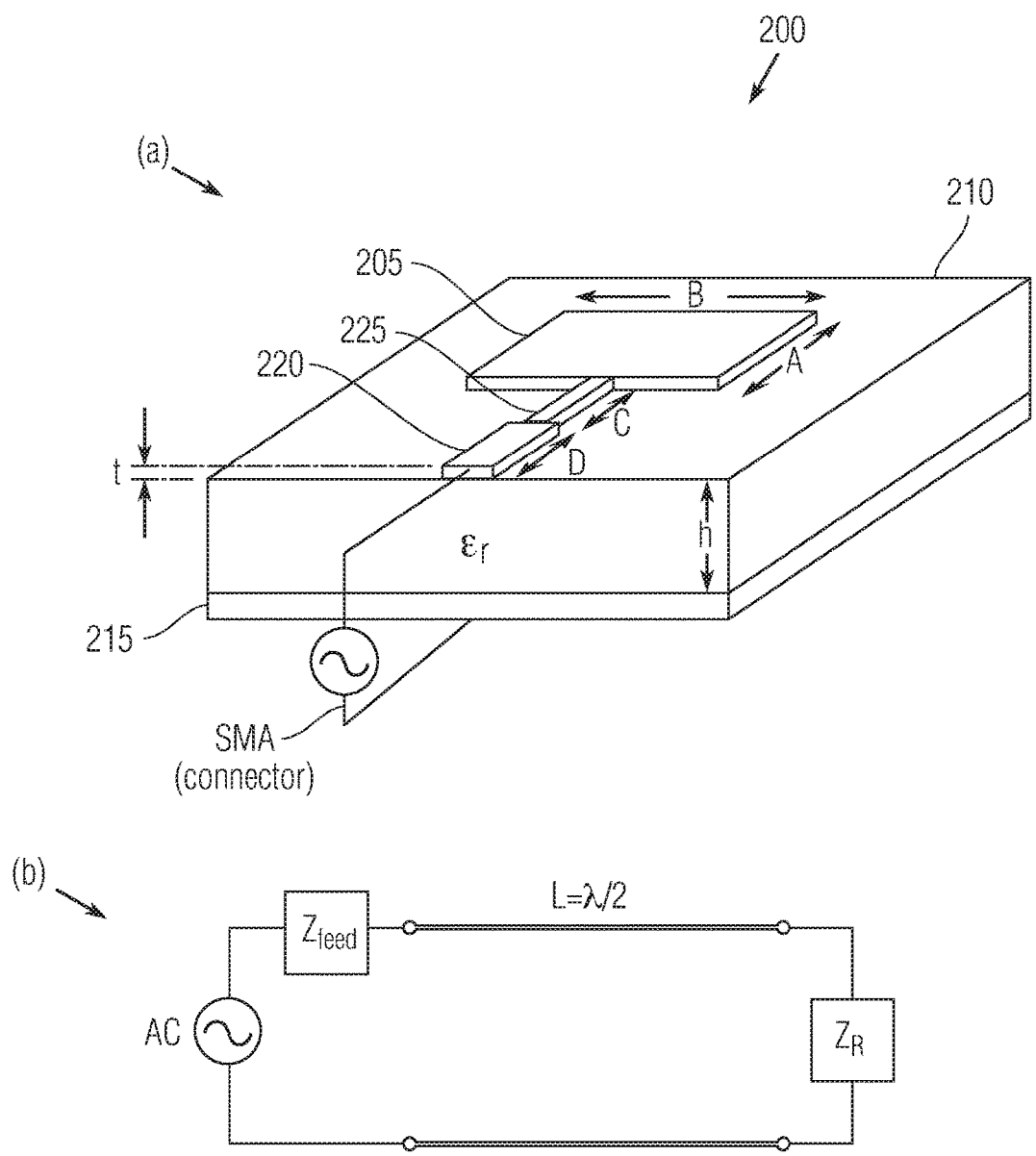
FIG. 2 illustrates an exemplary design of a patch antenna and an equivalent circuit diagram in accordance with one or more embodiments of the invention.

An exemplary structure and design of a single patch antenna in accordance with one or more of the disclosed embodiments is illustrated in FIG. 2. Part "a)" shows the patch antenna design parameters and part b) illustrates the equivalent circuit diagram, where ZR represents the radiation resistance and Zfeed is the 50Ω feeding line. The length (A) of the antenna can be represented as a half wavelength transmission line.

The structure consists of a metallization conductive patch 205, a dielectric substrate 210 upon which the conductive patch is supported, and a ground plane 215. The patch can be fed with different feeding methods such as using a microstrip feeding line 220 in the plane against the ground plane or a coaxial probe connected from the bottom of the patch (not shown). In the illustrated patch 205, a quarter-wave section matches the radiating patch to a 50Ω feeding line, for instance, to provide an electrically favorable coupling to a BNC or other connector in order to connect to downstream equipment (e.g., a network analyzer).

There are some practical considerations, such as cost, performance and mechanical properties, which can be taken into account when choosing the substrate type. Materials of low or high relative permittivity can be used depending on the required application. Mechanical properties of the substrate such as the flexibility and temperature dependence are among the important considerations for flexible plastic electronics. The dielectric substrate presents a load to the radiating patch, and so the pattern of the antenna is, in part, a function of the dielectric load of the supporting dielectric 210.

Antennas work by converting the electric currents into radio waves. In wire antennas, in order to create radiation, there is a time varying current to accelerate/decelerate the motion of charges within the conductive medium. So, to create charge acceleration/deceleration, there must be a circuit feature of discontinuity, curvature or termination. In patch antennas, the radiation is determined from the electromagnetic fields distribution lie between the radiating patch and the ground plane. In other words, the radiation mechanism can be described in terms of the surface current distribution on the patch.

Principles of Operation of a Single Patch Antenna

The energy feeding to the patch 205 will create a charge distribution on the upper and lower surfaces of the patch as well as on the ground plane 215 surface. The movements of these charges create corresponding current densities and magnetic field intensity produced. The antenna length is preferably designed to make it resonate by tuning (changing) the antenna physical dimensions. Any antenna with a specific physical dimension will resonate at a specific frequency. Thus, the antenna can be tuned to desired frequency, such as the frequency being transmitted. The spectrum analyzer (e.g., analyzer 115) can be used to discern the antenna's optimal matching (tuning) frequency by measuring the received power at different frequencies and identifying the frequency or range of frequencies with the least loss.

The electrical definition of resonance from the circuit theory point of view, it is the frequency at which the inductive and capacitive reactances cancel each other out, therefore, at this frequency the antenna is purely resistive and a combination of loss resistance and radiation resistance.

Frequency Shift is a sensitive mechanism. The shift in resonance frequency is related with the length of the antenna according to the equation:

$$f_c = \frac{c}{2L\sqrt{\varepsilon_r}}$$

A resonant structure of a $\lambda/2$ in length will exhibit resonance at a frequency which makes the electrical length of the line half a wavelength. Now if the velocity of propagation along the line decreases (which means the wavelength along the line decreases at a given frequency) then the resonant frequency will decrease. The percentage decrease in resonant frequency must equal the percentage decrease in velocity of propagation ($v_p$), since $v_p = f\lambda$.

A patch antenna generates the maximum radiation in the direction perpendicular to the substrate (broadside direction) and ideally no radiation energy can be found along the surface of the substrate (end fire direction). The patch can be considered as a four open sidewall rectangular resonant cavity (filled with the substrate material) and the fringing fields from these walls are the fields responsible for the radiation mechanism in the antenna device. The limitation of fringing fields can make the bandwidth poor for this kind of antenna.

The region under the patch acts like an open circuit with two sides resonant cavity where the electromagnetic energy is guided and coupled. Some of this coupled energy leaks (radiates) into space and this is how the radiation mechanism is created.

Because it is the size of antenna which matters the most, the antenna length electrically behaves as if it is longer and slows down the propagating wave. Even if examined from the point of capacitance frequency relationship for circuits in general, the frequency goes down when the capacitance is high and plays an important role. The following equations show the frequency dependence in LC circuits and show that the presence of capacitive elements in a circuit will directly affect the frequency and, by increasing the capacitance, the frequency reduces.

$$\omega_o = \frac{1}{\sqrt{LC}}$$

$$\text{or } f_o = \frac{1}{2\pi\sqrt{LC}}$$

Meaning that if the patch dimension changed, the capacitance will be affected as well and this will directly affect the resonance frequency in a similar form to the physical effect mentioned above.

Exemplary Design of a Single Patch Antenna

At the edge of the antenna patch 205, the impedance is usually high (e.g. 400Ω) and a matching network between the patch and a typical 50Ω feeding line 220 is provided to avoid an impedance mismatch. In the exemplary design of antenna patch 200, a section 225 of a quarter wavelength transformer can comprise a matching network to transform an input impedance to the particular feeding line 220 (e.g., a 50Ω line) (i.e. the input impedance $Z_{in}$ at the feeding line will be seen as 50Ω).

In designing the patch, there are some important lengths which can be taken into consideration to achieve a desired resonance condition at a specific frequency (the resonance, design or centre frequency $f_c$). In FIG. 2, the patch 205 has a length A which is preferably half a substrate wavelength ($\lambda_s/2$) to make the structure resonate and behave like a λ/2 dipole antenna. The width B of the patch is not critical, however, for example, the width can be the same as A (i.e B=A) for symmetric dimensions. FIG. 2 also shows the antenna 200 with a front-feed arrangement (sections 225 and 220 with lengths C & D, respectively), which has the patch fed from the same side on the top of the substrate. As noted, the matching section 225 (having length C) between the patch and the feeding line can be provided to match the high impedance point at the patch to the 50Ω feeding line. The matching network has a length C of $\lambda_s/4$. The following equations explain the design information and calculations of the lengths A, B, C and D and are adopted from D. Redinger, S. Molesa, S. Yin, R. Farschi, V. Subramanian, "An ink-jet-deposited passive component process for RFID," IEEE Trans. Electron Devices 51, pp. 1978-1983 (2004).
A=the patch's resonant length. It is preferably half a substrate wavelength ($\lambda_s/2$). However, the fringing effect (the open-end effect) should be taken into account by subtracting it at each end of the patch. Thus, the actual length can be expressed as $$A = \frac{\lambda_s}{2} - 2 \cdot l_{oe}, \quad (5)$$

where $l_{oe}$ is the equivalent open-end effect length. The substrate wavelength can be expressed as $$\lambda_s = \frac{\lambda_0}{\sqrt{\varepsilon_{r\_eff}}}, \quad (6)$$

where $$\varepsilon_{r\_eff} \approx \frac{\varepsilon_r + \varepsilon_{r,air}}{2}, \quad (7)$$

where $\varepsilon_r$ represents a Kapton substrate dielectric constant and $\varepsilon_{r,air}=1$.

In addition, as noted, in the particular design, $$B=A \quad (8)$$

and $C=\lambda_s/4$, the length of a quarter wavelength matching transformer. This section has transformer impedance of $Z_0$ which matches the feeding impedance and the patch radiation resistance ($R_{patch}$) expressed in the following equations.

$$Z_0 = \sqrt{R_{feed} \cdot R_{patch}} \quad (9)$$

$$R_{patch} = 90 \cdot \left(\frac{\varepsilon_r^2}{\varepsilon_r - 1}\right) \cdot \left(\frac{A}{B}\right)^2 \quad (10)$$

Lastly, section 220 with length D is the 50Ω feeding impedance and is chosen to be long enough to enable attachment of an SMA (which stands for subminiature version A) coaxial RF connector and is for introducing the AC signal.

While the foregoing discussion describes how the increase in the length A of a single patch can affect the resonance of the single patch antenna, the concept similarly applies an antenna comprising multiple patches that, preferably, have the same respective dimensions. More specifically, increasing the number of patches in antenna array generally should not affect the resonance frequency, but will increase the overall antenna performance in terms of improving directivity and gain. Gain and directivity, however, are not necessarily critical parameters in detecting physical changes in the antenna array.

As noted, the diagnostic computing system is configured to measure frequency shift of the antenna array and correlate it to the physical expansion/contraction change of the antenna array. Any expansion or contraction that affects the dimensions of one or more of the patch antennas will affect the measured resonance frequency value for the entire array. The magnitude of the frequency shift can depend on the size of the physical change as a function of the dimensions of the antenna affected by the change. For instance, a given change in length of a small patch can result in a frequency shift that is relatively greater than the frequency shift resulting from a larger sized patch undergoing the same change in length. In addition, the smaller the resultant dimensions the higher the frequency shift and the larger the antenna dimension the lower the frequency shift, wherein the term "resultant dimension" refers to the produced physical dimension of one patch of the antenna array or the whole antenna array (e.g., a summation of the dimension changes of multiple patches) and "smaller resultant dimensions" refers to negative changes in physical dimension caused by contraction, and "larger resultant dimensions" refers to positive changes in dimension caused by expansion.

In other words, a change in the length A of a single patch or multiple patches, will affect the measured frequency response of the entire array. For instance, in practice, if an increase in the length A of a single patch happened due to some expansion process, the resonance peak will be affected. For example, one way of designing an antenna array is to choose the designing operating frequency to be 2.4 GHz. Accordingly, for small changes in the antenna's physical dimensions, the shift will be seen in the kHz range, while for large changes, larger variations in the resonance peak can be expected, for example, changes that could be in the order of GHz. VNAs can detect these kHz/GHz changes and, as a result, the disclosed measurement methods can detect and measure changes in length with high sensitivity. As would be understood, the sensitivity of the measurement can depend on the accuracy of the VNA instrument.

In view of the foregoing, it can be appreciated that the total length of the antenna array (i.e., the distance between the first patch and the last patch in the array), the spacing in between patches or the number of patches in the array generally should not affect the resonance frequency for the entire array. As explained above, increasing the patches (or array length) will increase gain and directivity. However, some design considerations relating to the overall length of the entire antenna array can include the antenna's gain, which can depend on parameters including the number of patch elements (array length) and spacing between the elements. Equal spacing between adjacent patches can be considered in the design of the array and a uniformly spaced linear array can be an important factor. The optimum spacing can be calculated by the aid of computer simulation software such as ADS (Aided Design Software) or ANSYS. Non-uniformity spacing may cause many side lobes in the radiation response. Spacing will affect the antenna's gain but not the resonance frequency.

During use, measured changes in resonance frequency, which correlate to changes in length of one or more of the patch antennas, are of primary importance. However, other electrical parameters of the antenna array can be analyzed to detect changes in the physical length of the overall patch array which might not affect the length of patches individually. For instance, if the expansion of the array does not affect the patches' respective lengths, then the resonance frequency should not be affected, however, side lobes can be expected in the radiation response. Accordingly, changes in the spacing between one or more patches can be detected based on the detection of side lobes.

It should be understood that the disclosed embodiments including an antenna array comprising an array of patch antennas is provided as a non-limiting example. There are many ways to design antenna array and the disclosed concepts are applicable to almost any type of antenna device. For example, for horn antennas, resonance frequency depends on the horn's aperture, and the disclosed concepts for sensitively measuring changes in dimensions of the antenna based on the relationship between physical length and electrical length is similarly applicable to such an alternative antenna configuration.

Exemplary arrangements of multiple patch antennas (e.g., patch antenna 200) which define an antenna array in accordance with one or more of the disclosed embodiments are further shown and described in connection with FIGS. 3-5.

Figure 3:
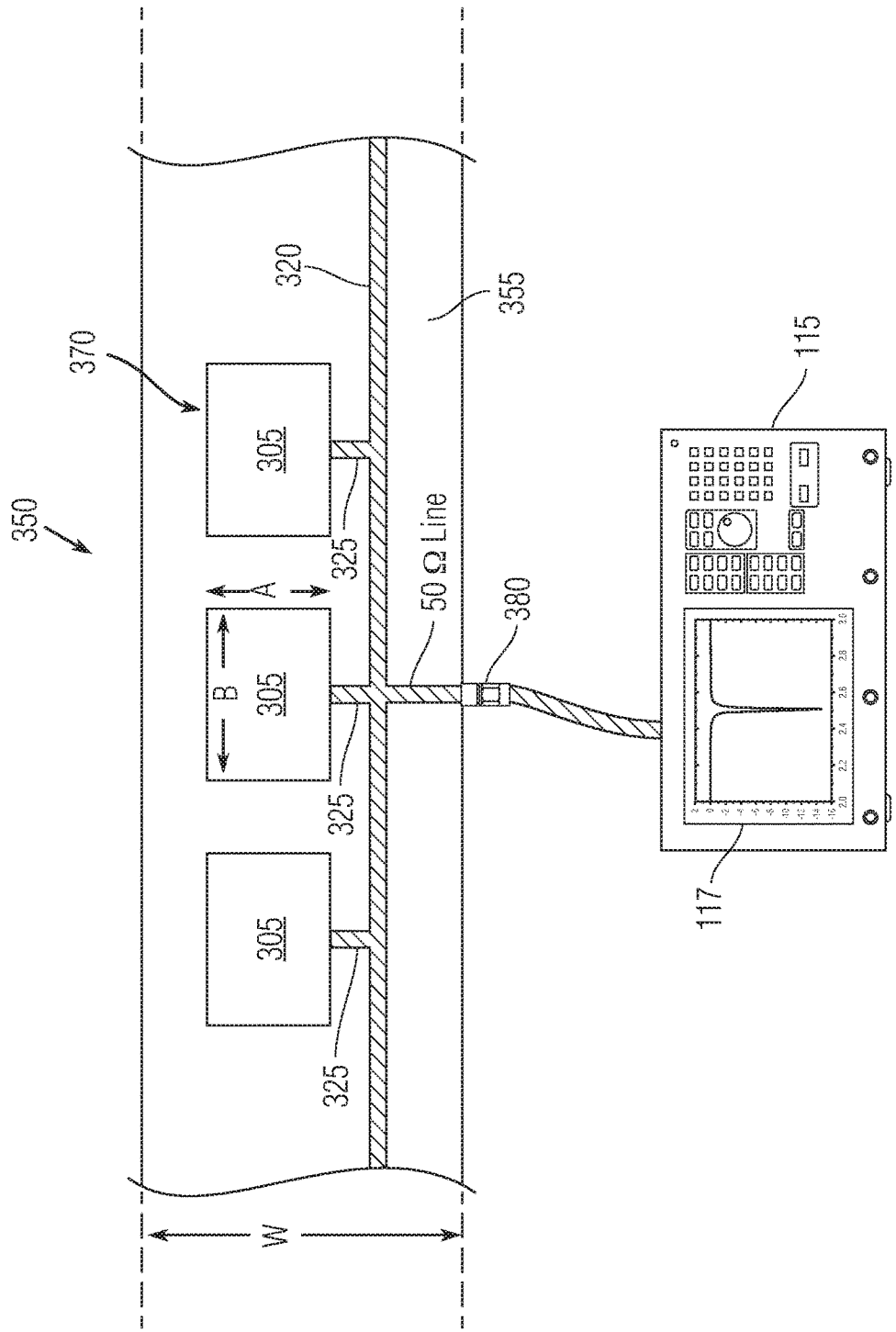
FIG. 3 illustrates an exemplary configuration of an antenna array of a smart strap in accordance with one or more embodiments of the invention.

FIG. 3 illustrates a portion of an exemplary smart strap 350 in accordance with one or more embodiments of the invention. The smart strap 350 comprises a substrate 355 having a width W and an antenna array 370 provided along the length of the substrate. The antenna array 370 comprises multiple individual patch antennas 305 having a similar configuration to the patch 200 of FIG. 2. As shown, the patch 305 has length A and width B and are arranged in a single row and spaced apart in the lengthwise direction. Each patch is connected to a feeding line 320 that runs the along the length of the substrate by a respective "matching section" 325 having a length C. The feeding line, for example, is a 50 Ohm feeding line as described in connection with FIG. 2. The feeding line is also connected to a network analyser 115 by a wire and SMA connector 380. As noted, the network analyser can be used to supply electrical signals to the antenna array and measure the electrical parameters of the antenna array. For example, such parameters such as the resonance frequency of the antenna array can be displayed on an associated display 117 of the network analyser.

Figure 4:
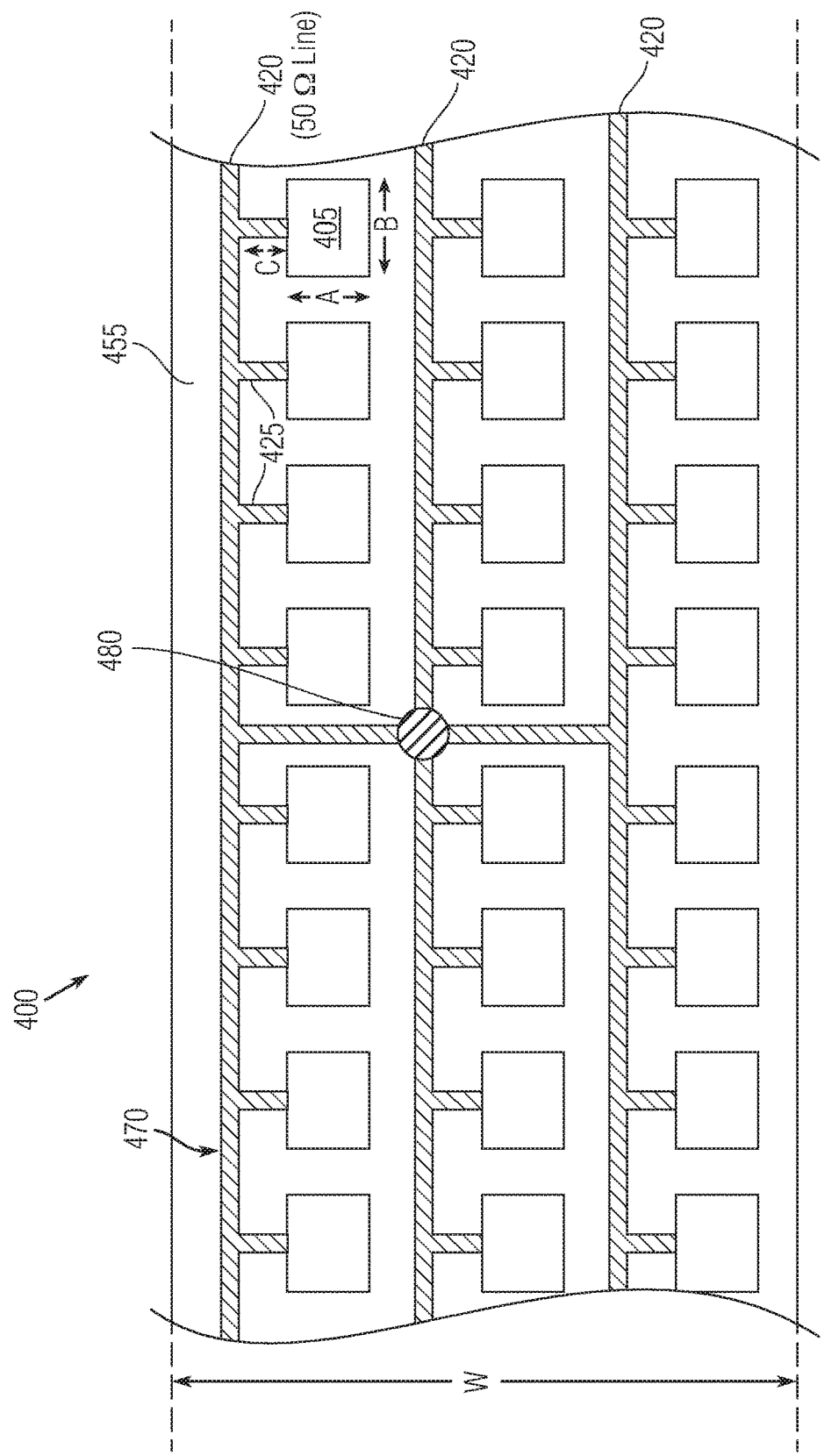
FIG. 4 illustrates an exemplary configuration of an antenna array of a smart strap in accordance with one or more embodiments of the invention.

FIG. 4 illustrates a portion of an exemplary smart strap 450 in accordance with one or more embodiments of the invention. The smart strap 450 comprises a substrate 455 having a width W and an antenna array 470 provided along the length of the substrate.

The antenna array 470 comprises multiple (e.g., three) parallel rows of patch antennas 405 having a similar configuration to the patch 200 of FIG. 2. As shown, each row comprises patches 405 having a length A and width B and that are arranged in a linear row and spaced apart in the lengthwise direction. Each patch in a row is connected to a feeding line 420 that runs the along the length of the row by a respective "matching section" 425 having a length C. The feeding line, for example, is a 50 Ohm feeding line as described in connection with FIG. 2. Accordingly, in this particular exemplary configuration the array comprises three linear arrays of patches that are fed in series. As shown in FIG. 4, the feeding lines of respective rows can be connected together and to a connector 480 (e.g., an SMA connector) that allows for a network analyser/exciter (not shown) to be connected to the antenna array via, for example, a coaxial probe (not shown). Thus, the connected devices can be used to supply electrical signals to the antenna array and measure the electrical parameters of the antenna array.

Figure 5:
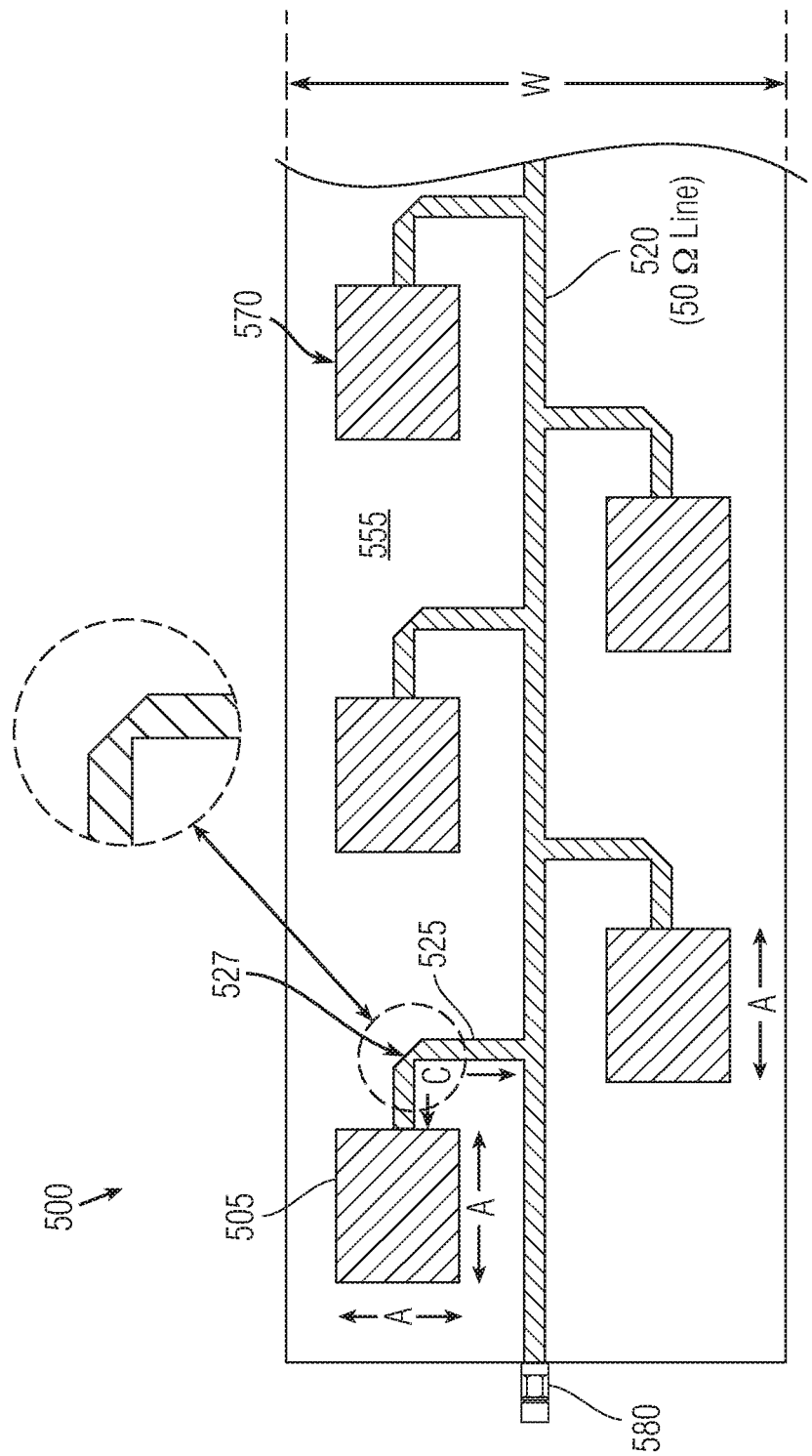
FIG. 5 illustrates an exemplary configuration of an antenna array of a smart strap in accordance with one or more embodiments of the invention.

FIG. 5 illustrates a portion of an exemplary smart strap 550 in accordance with one or more embodiments of the invention. The smart strap 550 comprises a substrate 555 and an antenna array 570 provided along the length of the substrate.

The antenna array 570 comprises multiple (e.g., two) parallel rows of patch antennas 505 having a similar configuration to the patch 200 of FIG. 2. As shown, each row comprises patches 505 having a length A and width B and that are arranged in a linear row and spaced apart in the lengthwise direction. As further shown in FIG. 5, the patches can be staggered such that patches in adjacent rows are not aligned in the width-wise direction W. Each patch is connected by a respective "matching section" 525 having a length C to a common feeding line 520 that runs along the length of the substrate between the rows of patches. The feeding line, for example, is a 50 Ohm feeding line as described in connection with FIG. 2. As shown in FIG. 5, the feeding line can be connected via a connector 580 (e.g., an SMA connector) to a network analyser/exciter 115.

FIG. 5 further illustrates an exemplary design of the matching section 525 that has an elbow shape, rather than providing a straight connection from the patch to the feeding line. In addition, the enlarged view of the corner 527 of the matching section 525 shown in FIG. 5 further illustrates that the corner of the elbow has an angled (or "truncated") outer edge, as opposed to the corner of the elbow forming a sharp edge (e.g., a 90 degree angle). Such a configuration can improve current distribution and achieve better transmission.

Smart Strap Container Measuring System

Figure 6:
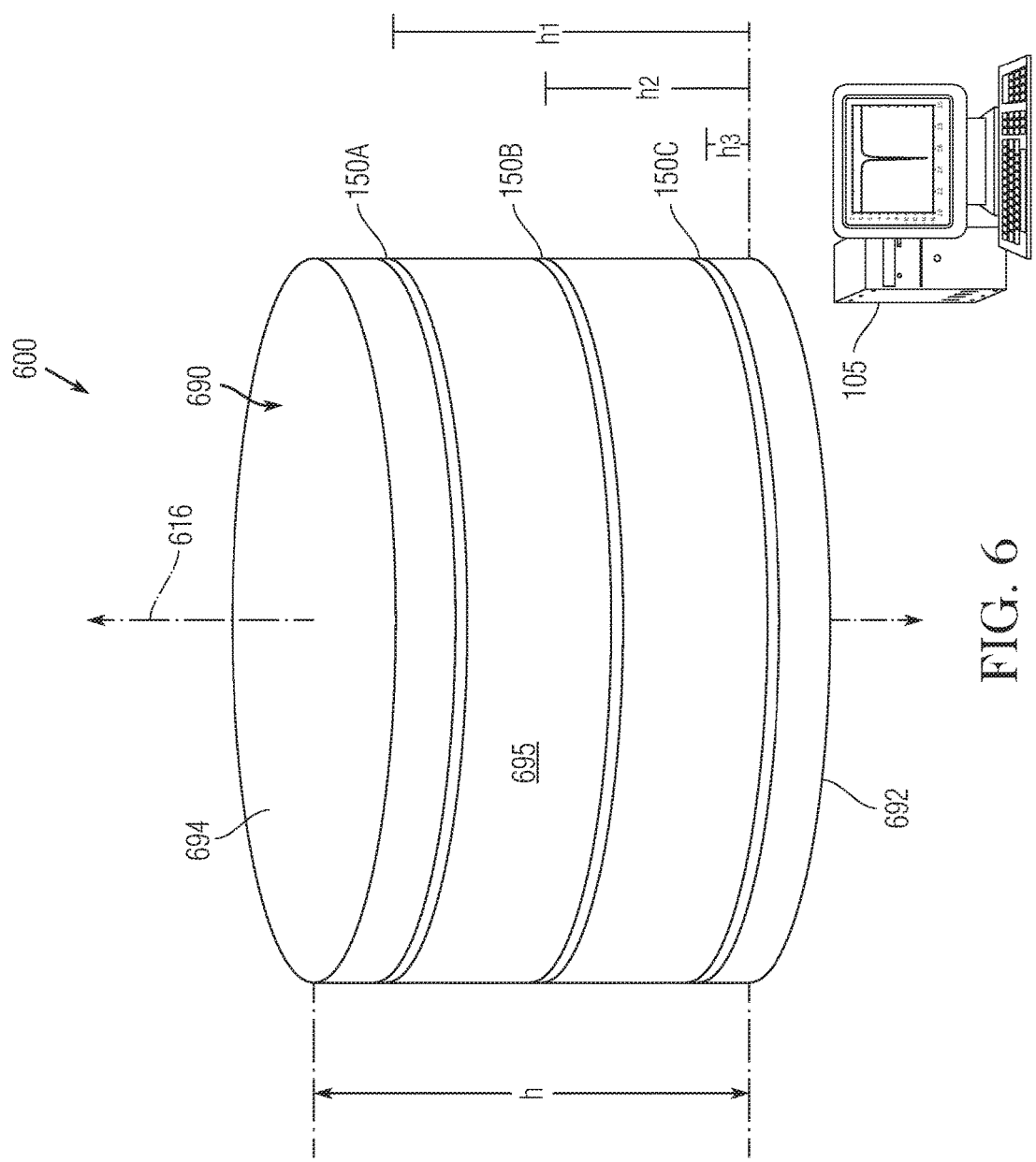
FIG. 6 illustrates an exemplary measuring system configured to calibrate the volume of a storage container in accordance with one or more embodiments of the invention.

An exemplary measuring system 600 is shown in FIG. 6. The system 600 includes one or more smart straps deployed around the exterior surface of the side wall 695 of the container 690. As shown in FIG. 1, a plurality of smart straps 150A, 150B and 150C are extended circumferentially around the sidewall at respective heights (h1, h2, and h3, respectively) to define an array of smart straps.

As shown in FIG. 6, the longitudinal axis 616 is a central axis extending between the base of the container 692 (e.g., where the container is anchored or placed on the ground) and the opposing top end 694 of the container. For simplicity, the disclosed embodiments are described under the assumption that the base of the cylindrical container is anchored on flat ground and the sidewalls 695 extends upwards in the longitudinal direction (i.e., in the vertical direction relative to the ground/base of the container). Accordingly, the term "longitudinal direction" is intended to refer to a direction that is parallel to the longitudinal axis. As can be appreciated, given a container assumed to be anchored to the ground, and as you move away from the base, along the longitudinal axis, there is an infinite set of transverse or "latitudinal" planes extending through the cross-section of the container having respective heights (as measured in the longitudinal direction relative to the base), on which the smart straps can be extended circumferentially around the exterior surface of the container wall.

Although the exemplary systems and methods for measuring container volume are further described herein in the context of a particular practical application, namely, measuring the volume of large petroleum storage containers having a cylindrical shape, it should be understood that the subject invention is not limited to this exemplary application. For instance, in some implementations, the containers can be oriented such that the central axis extends horizontally relative to the ground. The exemplary techniques disclosed herein are similarly applicable to calibrating the volume of containers having other shapes, for instance, spherical tanks, however, it can be appreciated that such alternative container shapes can require a different set of known parameters (e.g., relative placement or distance between measurement devices) in order to calculate the container volume.

As shown in FIG. 6, the smart straps are connected to a diagnostic computing system 105 (connection means not shown) which is configured to coordinate the operation of the container volume calibration system 600 and the various smart strap measuring devices. As shown and described in connection with FIGS. 1-5, the diagnostic computing system can include a vector network analyzer component, which is connected respective smart straps and configured to excite and measure electrical characteristics of the antenna arrays, and connected to a control computer component for processing the information measured using the network analyzer component. As further described in relation to FIG. 9, the diagnostic system 105 can comprise one or more processors (not shown), which execute one or more software modules in the form of machine implementable code and, in doing so, is configured to coordinate the measurement operations using the smart straps connected thereto. In addition, the software configures the diagnostic system to analyze the information measured using the smart straps, calculate the length of respective smart straps and geometrically calculate various dimensions of the container (i.e., the container's geometry).

Preferably, the array comprises a plurality of smart straps disposed at multiple heights on the exterior surface of the side wall 695 of the storage container (e.g., at different heights as measured in the longitudinal direction 616 from the base of the container, which is assumed to be level). Preferably, the position of the smart straps relative to the top/bottom of the container is known and, accordingly, the smart straps are spaced apart from one another a known amount in the longitudinal direction 116. As further described herein, utilizing at least two smart straps that have a known spacing can aid in the calibration of the volume of the container. In some implementations, one or more of the smart straps can be attached in a respective position on the container wall so as to provide a long-term or permanent calibration system. However, in some implementations, one or more of the smart straps can be deployed temporarily such that the system can be used to calibrate other containers on demand.

Figure 7:
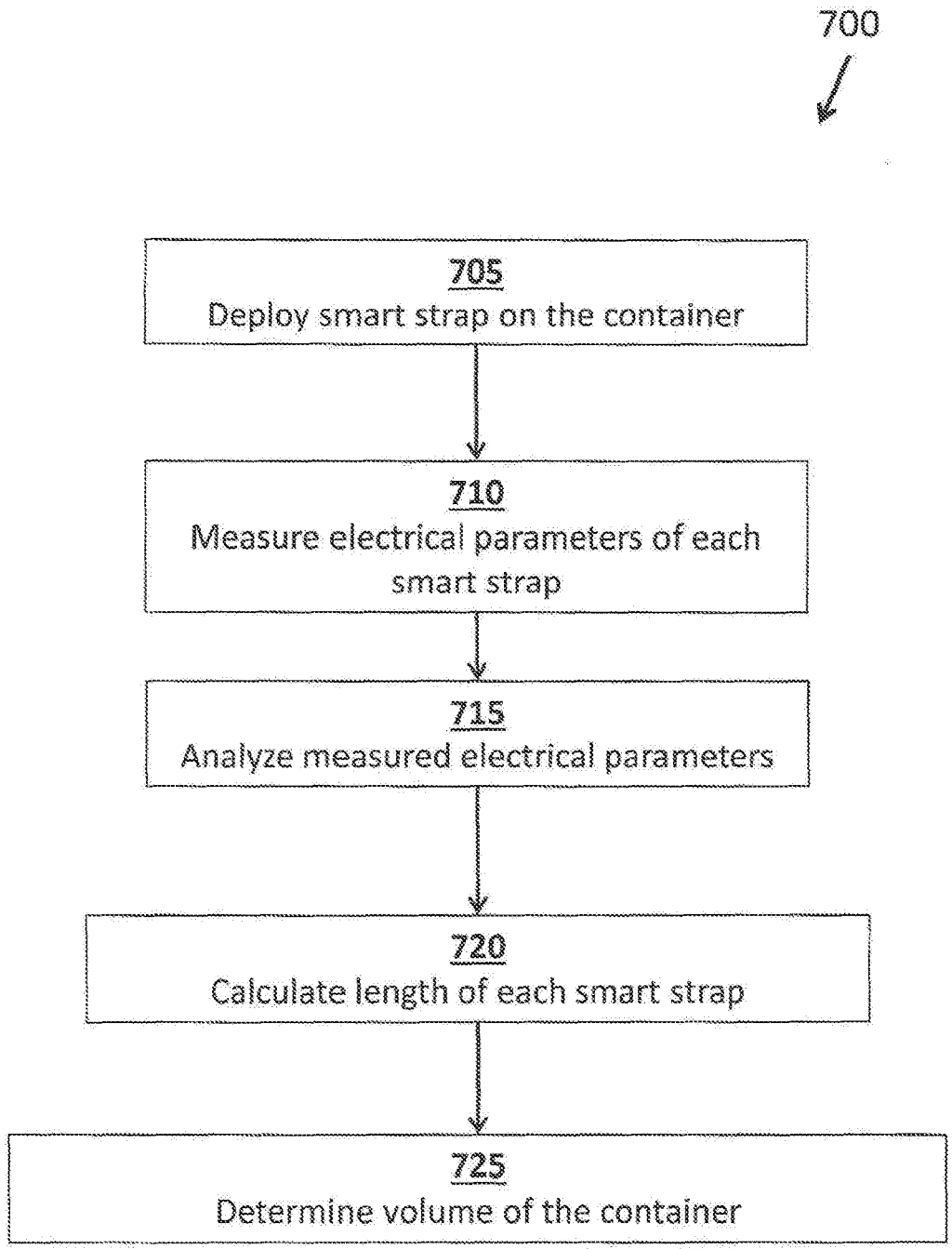
FIG. 7 is a flow diagram illustrating an exemplary routine for measuring the physical dimensions of an object using a measuring system in accordance with one or more embodiments of the invention.

The operation of the exemplary container measuring system 600 and the various elements and components described above will be further appreciated with reference to FIG. 7. FIG. 7 is a high-level flow diagram illustrating elements of a routine 700 for calibrating the volume of a storage container using the measuring system 600 according to embodiments of the invention.

The routine 700 begins at step 705, when the one or more smart strap devices (e.g., 150A, 150B and/or 150C), are physically deployed on the container at respective heights. More specifically, each smart strap can be deployed by extending the length of the smart strap circumferentially about the container's side wall 695. Deploying the smart straps can also include leveling each strap such that it has a consistent height throughout its length. Finally the smart strap can be secured to the exterior surface of the wall of the container such that the smart strap expands and contracts with the expansion and contraction of the portion of the container wall that it is attached to.

For instance, in the exemplary configuration illustrated in FIG. 6, deploying the smart strap and securing it into place can include joining the ends of the strap together and tightening the strap so as to form a loop about the container wall that has the same circumference as the container wall at the given location. The joining and securing step can be performed using any number of permanent or temporary securements, which are well known in the field for deploying strapping about a container. Accordingly, it should be appreciated that the smart straps can comprise stand-alone measuring devices extended about the containers. In addition or alternatively, the smart strap embodiments can be integrated with existing strapping systems commonly used in the art, for instance, by implementing the smart strap measuring device on a structural strapping substrate (e.g., an elongate metal strap) that is then secured about the storage container (e.g., for structural purposes).

While the smart straps are described as being deployed on the outer surface of the sidewall and configured to extend the circumference of the container, in some configurations, one or more of the smart straps can extend only partially about the container's periphery. In addition, smart straps can similarly be deployed on other walls such as a top or bottom wall as well as on interior surfaces of the container's walls.

The particular physical configuration of the smart strap including, the length of the substrate and the length of the antenna array can be designed for use with a container having a given circumference or designed to be adapted for use with containers of different sizes. For instance, the strap substrate can have a length that is suitable for extending the circumference of a given container (e.g., 50 meters long), and the antenna array can be positioned in the middle of the strap and sized such that it extends almost to the ends of the straps (e.g., is 48 meters long) so as to leave a section of strap at each end that does not have any antenna patches and can be trimmed to fit the container without interfering with or damaging the antenna array. Accordingly, the antenna array extending substantially around the circumference can still facilitate accurate detection of changes in dimensions while enabling the strap to be used with containers of various sizes. Alternatively, the antenna array can be configured to terminate greater or lesser distances from respective ends of the substrate. In addition, the array can be offset to one end rather than extending even distances from the mid-point of the elongate substrate. In addition, as noted, the substrate material is preferably chosen to be flexible and have an impedance that is close to the impedance of air (e.g., a low dielectric permittivity flexible material), as this will facilitate trimming the substrate to size and calibration of the system in the field, as further described herein.

At step 710, the electrical properties of each of the one or more smart straps is measured using the diagnostic computing system 105. In particular, the control computer 110, which is configured by executing one or more of the software modules including, for example and without limitation, the excitation module 970 and parameter measurement module 972, can cause the network analyzer to generate signals that excite the antenna array of a given smart strap connected thereto. Alternatively, the network analyzer can be manually controlled, say, by a human operator. The network analyzer can also be configured to measure various electrical parameters relating to the functioning of the antenna array in response to the excitation signal. In addition, at step 710 the measurements taken using the network analyzer can be recorded by the control computer 110 for further processing.

The measurement procedure can be first performed during a calibration process and subsequently repeated to collect measurements that are useable to detect and quantify changes in antenna length. In any phase, the measurements process can be the same and involves excitation of the antenna using VNA and measurement of the response. More specifically, during measurement, the VNA stimulates the antenna device under test (which is a radio frequency network with one port in the exemplary embodiments disclosed herein) with a swept continuous wave signal. The network is composed of a port (excitation SMA/coaxial port) and the load (the antenna itself). The excitation signal from the source can be introduced with controllable frequency to drive the antenna. The source provides the stimulus that is used to characterize the antenna response. The output measured by the VNA is typically a sine wave for single frequency S parameters. The source will rapidly sweep across frequencies to collect the antenna function response with its amplitude and phase angle. The main output of the VNA can take various forms, for instance, typically the output will be a graph illustrating the resonance frequency with x-axis represent the spectrum range in Hz/GHz while y-axis represents the return loss in dB, as shown in FIG. 1. Then at step 715, the control computer 110 analyzes the measured electrical parameters. In some implementations, the control computer, which is configured by executing one or more of the software modules including, for example and without limitation, the parameter analysis module 974, can calculate a difference between the measured electrical parameter for a given smart strap from a known reference or baseline electrical parameter for the given smart strap. For instance the control computer can calculate a difference between the measured resonance frequency for the given smart strap and the baseline resonance for the frequency to determine a change in resonance frequency.

In accordance with one or more of the exemplary embodiments, initial calibration of a smart strap can be performed during manufacture of the smart strap, at some point thereafter (e.g., periodically), upon deployment of the smart strap in the field or any combination of one or more of the foregoing times. Calibration can involve measuring the reference/baseline length of the antenna array of a given smart strap using a measuring instrument of known length and also measuring the electrical properties of the antenna array having a relation to the measured reference length. Calibration can also include storing, by the control computer 110 on an associated storage medium, information about each calibrated strap including its reference length, reference electrical parameters, identification information and other information deemed relevant to its use (e.g., information describing the configuration of the antenna array, deployment location, previously measured length, previous calibration dates, previous dates it was used for measuring, manufacture date and the like).

In some implementations, step 710 for measuring the electrical properties of a particular smart strap or step 715 for analyzing the measured electrical parameters can include the step of identifying the particular smart strap and corresponding antenna array being measured, which can then be used to retrieve information about the particular smart strap from a database of antenna information. The identification step can involve obtaining unique information for the smart strap, which can be performed in a variety of ways including, for example: reading an identifier from the smart strap (e.g., an operator reading a numerical identification code provided on the smart strap and inputting the identifier into the control computer); automatically reading an encoded identifier provided on the smart strap using an electronic code reader in communication with the diagnostic system (e.g., a barcode scanner); electronically interrogating the antenna array using the diagnostic system (e.g., the network analyzer) and capturing information suitable for identifying the antenna array. By way of further example, the smart strap can be identified by comparing its location (e.g., its GPS location as measured using a GPS sensor) and position on the container (e.g., top, bottom, middle strap etc.) to corresponding smart-strap information recorded in the database during deployment.

At step 720 the control computer 110 calculates a length for the one or more smart straps based on the analysis performed at step 720. More specifically, the control computer, which is configured by executing one or more of the software modules 130 including, for example and without limitation, the dimension analysis module 976, can be configured to calculate the current length of a given smart strap based on the measured change in one or more of the electrical parameters. It should be understood that the steps for measuring the electrical parameters at step 710, calculating the change in electrical parameters at step 720 and analyzing the foregoing information to calculate the smart strap operational length at step 725 can be performed according to the previously described patch antenna and antenna array principles and analysis techniques.

For instance, as noted, the resonance frequency of an antenna array is a function of the antenna array length according to a well-known relationship. Accordingly, the change in length of the given smart strap can be determined from the change in resonance frequency and the reference length of the given smart strap.

In one configuration, data measured using the VNA can be saved and extracted at any time from the VNA 117 during all phases of calibration or measurement and loaded onto the computing device 115 from a medium such as a removable storage medium or a communication cable. Typically, VNA saves data as "csv" format and analysis of the data can be performed by the computing device 115 using programs such as a spreadsheet, ORIGIN or MATLAB. The analysis can include comparing different peaks over the same frequency spectrum that are used for calibration and measurements. It should also be understood that certain VNAs have developed analysis software tools that can be utilized to identify and quantify changes in salient electrical parameters. Furthermore, based on the measured changes in the electrical parameters, including for example, a given change in resonance frequency, the known relationship between the electrical parameter and length can be used to calculate the change in length of the antenna array. In view of the previously measured baseline length of the antenna array and the corresponding baseline length of the smart strap, as measured during initial calibration or a previous measuring operation, the current/actual length of the antenna array and/or smart strap can be determined.

At step 725, the control computer determines the volume of the storage container as a function of the lengths of the one or more smart straps calculated at step 725. More specifically, in the example shown in FIG. 6, the length of each smart strap represents the circumference of the container at the respective heights. Accordingly, the volume can be mathematically modeled by the configured computing device 110 according to well-known geometric principals using the measured circumferences of the container, the known heights of the respective smart straps and the overall height of the container. Calculation of the container's dimensions can also be based on additional known parameters and assumptions, for instance a constant height of the container, cylindrical shape, constant radius of curvature and the like, as would be understood by those in the art.

Figure 8:
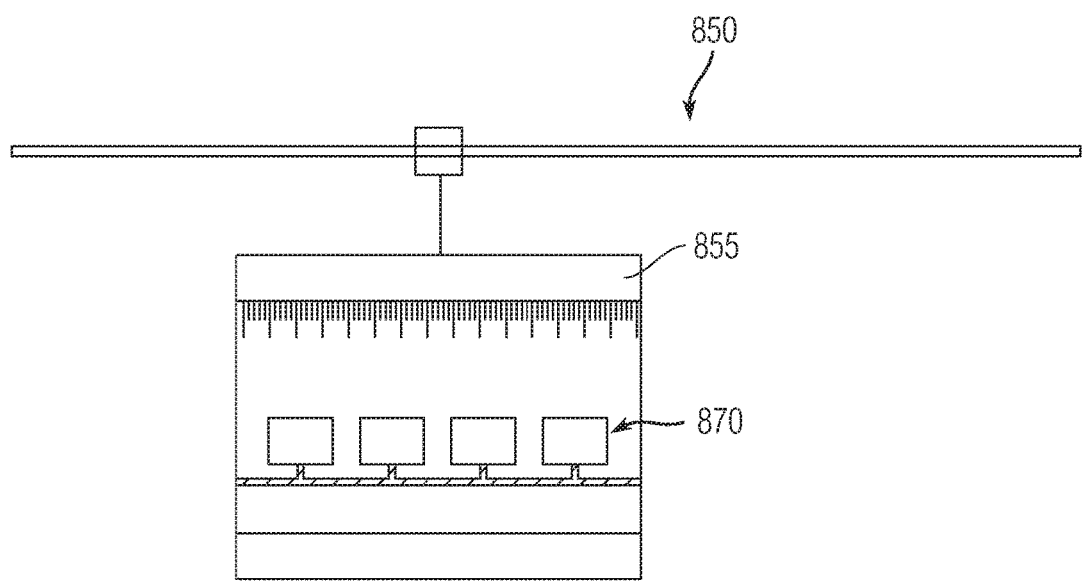
FIG. 8 illustrates an exemplary measuring device in accordance with one or more embodiments of the invention.

As previously noted, the exemplary design of the smart strap measuring device can be configured to provide a stand-alone measuring instrument capable of accurately self-calibrating its true length based on the electrical properties of the antenna array, which are measured and analyzed according to aforementioned analysis techniques. It should be understood that aspects of the exemplary routine 700 can similarly be executed to measure the length of a stand-alone measuring device, for instance, steps 710-720. For instance, FIG. 8 is a high-level view of an exemplary configuration of a measuring device 850 and provides a close up conceptual view of a section of the measuring device. As shown, the measuring device is in the form of an elongate measuring tape comprising a substrate 855 that includes evenly spaced markers representing a measure of length in increments. As shown in the close-up view, the device 850 includes an antenna array 870 configured to extend the length of the substrate 855. It should be understood that the conceptual view depicts the antenna array in a simplified form (i.e., as a periodic signal on the surface of the substrate 855 extending lengthwise alongside of the incremental markings) and that the substrate and antenna array can designed in accordance with any of the foregoing exemplary antenna array configurations. For instance, the antenna array can comprise one or more arrays of patch antennas that are provided on or embedded within the substrate 855. It should also be understood that the antenna array can be an assembly comprising, patch antennas, feed lines and other antenna array components printed on a substrate, and the antenna assembly can be affixed onto or embedded within another substrate material (e.g., the elongate substrate 855) that defines the main structure of the measuring device 850.

The exemplary measuring systems incorporating such measuring devices (e.g., measuring devices 850 or 150) can be used in a variety of ways. In one configuration, in order to perform highly precise measurements using the measuring device, say, device 850, the patch antenna array 870 extending substantially along the length of the measuring instrument can be tested and analyzed according to the aforementioned techniques to calibrate the length of the measuring device 850 itself. In other words, the actual length of the measuring device 850 can be determined in real-time based on the physical expansion/contraction of the substrate 855 and antenna array 870 relative to its previously calibrated state. Accordingly, the so-calibrated measuring device can be used to accurately measure (e.g., calibrate or verify) the length of other objects such as structures or even other measuring instruments. As a practical benefit, the disclosed systems and methods avoid the need to have measurement tools calibrated by a certifying agency, as the antennas are configured to perform a 'self-calibration' of the measurement tool, thereby determining the true length based on the frequency response of the antenna. Second, the exemplary measuring devices and analysis methods can also be used to measure changes in the surface or materials that the measuring device is affixed to, for example, as described in connection with FIGS. 6 and 7. The value of either configuration can be enhanced at larger scales where the precision of the antennas is more significant relative to the length of the measuring instrument needing calibration.

Figure 9:
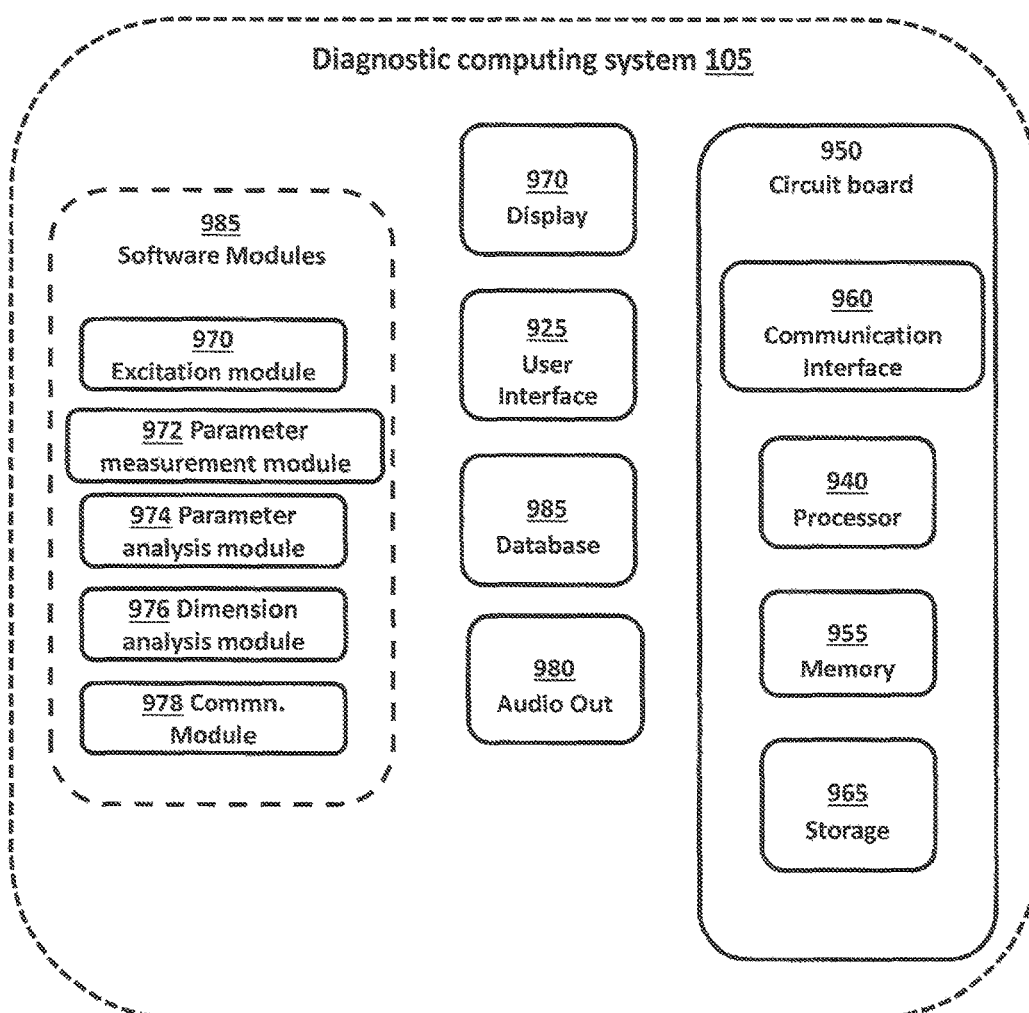
FIG. 9 is a block diagram illustrating exemplary hardware and software components of an exemplary control computing device according to an embodiment of the present invention.

FIG. 9 is a block diagram illustrating an exemplary configuration of hardware and software components of one or more of the computing devices that comprise the diagnostic computing system 105 (e.g., the control computer 110 and/or the network analyzer 115) described in the present disclosure as performing the various operations relating to the measurement of electrical properties of the smart strap antenna arrays, measuring the length of the smart straps and calibrating the dimensions of structures.

Components of the computing devices include a processor 940 and a circuit board 950. The circuit board can include a memory 955, a communication interface 960 and a computer readable storage medium 965 that are accessible by the processor 940. The board 950 can also include or be coupled to a power source (not shown) source for powering the computing device.

The processor 940 and/or circuit board 950 can also be coupled to a display 970, for visually outputting information to an operator (user), a user interface 975 for receiving operator inputs, and an audio output 980 for providing audio feedback as would be understood by those in the art. As an example, the processor 940 could emit a visual signal from the display 970, for instance, a graph depicting the frequency vs. the return loss for an antenna array measured using the network analyzer 115 and output on a display of the network analyzer or the control computer 110 (as is shown in FIG. 1). Although the various components are depicted either independent from, or part of the circuit board 950, it can be appreciated that the components can be arranged in various configurations.

The processor 940 serves to execute software instructions that can be loaded into the memory. The processor 940 can be implemented using multiple processors, a multi-processor core, or some other type of processor. The memory 955 is accessible by the processor 940, thereby enabling the processor to receive and execute instructions stored on the memory and/or on the storage. Memory 955 can be implemented using, for example, a random access memory (RAM) or any other suitable volatile or non-volatile computer readable storage medium. In addition, memory 955 can be fixed or removable.

The storage medium 995 can also take various forms, depending on the particular implementation. For example, storage medium 965 can contain one or more components or devices such as a hard drive, a flash memory, a rewritable optical disk, a rewritable magnetic tape, or some combination of the above. The storage medium 965 also can be fixed or removable or remote such as cloud based data storage systems (remote memory or storage configuration not shown). The storage, for example, can be used to maintain a database 980, which stores information relating to respective smart strap measuring devices and corresponding antenna array information, as previously described, information relating to the calibration of respective measuring devices or structures and or data used or generated while carrying out operations and implementing aspects of the systems and methods disclosed herein.

One or more software modules 985 are encoded in the memory 955 and/or storage medium 965. The software modules can comprise one or more software programs or applications having computer program code or a set of instructions executed in the processor 940. Such computer program code or instructions for carrying out operations and implementing aspects of the systems and methods disclosed herein can be written in any combination of one or more programming languages. While software modules are stored locally in storage 965 or memory 955 and execute locally in the processor 940, the processor can interact with remotely-based computing platform via communication interface 960, and via a local or wide area network to perform calculations or analysis.

During execution of the software modules 985, the processor 940 is configured to perform the various operations of the measuring systems described herein, including without limitation, the previously described steps for measuring electrical parameters of antenna arrays, analyzing the measured information to determine the length of respective smart strap measuring devices, and calibrating the dimensions of such devices and structures being measured therewith. The software modules can include code for implementing the aforementioned steps and other steps and actions described herein, for example and without limitation: an excitation module 970, which configures the processors to excite the antenna arrays with electrical signals; a parameter measurement module 972, which configures the network analyzer to measure the electrical signal response of the antenna arrays (e.g., electrical parameters as a function of the input signal); a parameter analysis module 974, which configures the processor to analyze the measured electrical parameters (e.g., calculate a difference between the measured electrical parameter and a previously measured baseline); a dimension analysis module 976, which configures the processor to measure a change in size of the smart straps based on the electrical parameters and calibrate the dimensions of any structures being measured with the one or more smart straps; and a communication module 978, which configures the processor to communicate with remote devices over a communication connection such as a communication network or any wired or wireless electronic communication connection.

The program code of the software modules 985 and one or more of the non-transitory computer readable storage devices (such as the memory 955 and/or the storage 965) can form a computer program product that can be manufactured and/or distributed in accordance with the present disclosure, as is known to those of ordinary skill in the art.

At this juncture, it should be noted that although much of the foregoing description has been directed to measuring devices and systems and methods for calibration of the volume of storage containers, the systems and methods disclosed herein can be similarly deployed and/or implemented in scenarios, situations, and settings far beyond the referenced scenarios.

It should be appreciated that more or fewer operations can be performed than shown in the figures and described. These operations can also be performed in a different order than those described. It is to be understood that like numerals in the drawings represent like elements through the several figures, and that not all components and/or steps described and illustrated with reference to the figures are required for all embodiments or arrangements.

Thus, illustrative embodiments and arrangements of the present systems and methods provide a system and a computer implemented method, computer system, and computer program product for calibration of the volume of storage containers. The flowchart and block diagrams in the figures illustrate the architecture, functionality, and operation of possible implementations of systems, methods and computer program products according to various embodiments and arrangements. In this regard, each block in the flowchart or block diagrams can represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The subject matter described above is provided by way of illustration only and should not be construed as limiting. Various modifications and changes can be made to the subject matter described herein without following the example embodiments and applications illustrated and described, and without departing from the true spirit and scope of the present disclosure, which is set forth in the following claims.

What is claimed is:

1. A measuring system for connection to a network analyzer, comprising:
    a measuring instrument including:
        a flexible elongate strap substrate having a length; and
        a flexible antenna array extending substantially along the length of the strap substrate, wherein the antenna array is either affixed to a surface of the strap substrate or embedded within the strap substrate, whereby compression or extension of the strap substrate causes compression or extension of the antenna array, and wherein the antenna array comprises:
            a plurality of interconnected patch antennas arranged in at least one row, wherein the plurality of patch antennas are electrically connected to a feeding line extending alongside the at least one row, and wherein the feeding line is configured to terminate in an impedance matched to the network analyzer such that the network analyzer can excite the antenna array with an input signal and measure electrical parameters relating to the antenna array's response to the input signal including a resonance frequency, and wherein the antenna array is configured such that it has reference electrical parameters that correspond to a reference length of the antenna array and the measured electrical parameters vary relative to the reference electrical parameters as a function of a change in the physical length of the antenna array during use relative to the reference length.

2. The system of claim 1, further comprising:
    a diagnostic computing system comprising:
        a non-transitory computer readable storage medium,
        a processor in electronic communication with the measuring instrument and the computer readable storage medium,
        one or more software modules comprising executable instructions stored in the storage medium, wherein the one or more software modules are executable by the processor and include:
            an excitation module that configures the processor to, using the network analyzer connected to the antenna array, generate the input signal to excite the antenna array,
            a parameter measurement module that configures the processor to, using the network analyzer, measure the electrical parameters including the resonance frequency relating to the antenna array's response to the input signal, and record the measured electrical parameters in the storage medium,
            a parameter analysis module that configures the processor to calculate, based on the measured electrical parameters, a change in the electrical parameters including the resonance frequency relative to reference electrical parameters for the antenna array stored in the storage, wherein the reference electrical parameters for the antenna correspond to a reference length of the antenna array and the strap substrate, and
            a dimension analysis module that configures the processor to calculate a current length of the antenna array and the strap substrate based on the calculated change in electrical parameter and the reference length.

3. The system of claim 2, further comprising:
    a plurality of the measuring instruments, wherein each measuring instrument is configured to be deployed on an exterior wall of a cylindrical storage container by extending the given measuring instrument circumferentially about the sidewall of the storage container at a respective height such that the length of the given measuring instrument corresponds to the circumference of the container at the respective height; and
    wherein the dimension analysis module further configures the processor to calculate the volume of the storage container based on the current length calculated for the antenna array of respective measuring instruments among the plurality of measuring instruments.

4. The system of claim 1, wherein the antenna array is defined by one or more layers of conductive and one or more layers of dielectric materials deposited on the flexible strap substrate.

5. The system of claim 1, wherein the measuring instrument comprising the flexible antenna array and strap substrate assembly is configured to be extended along and secured to an outer surface of a structure and is configured to conform to the outer surface of the structure such that expansion or contraction of the surface causes the length of the strap substrate and antenna array to expand or contract in a corresponding fashion.

6. The system of claim 1, wherein the antenna array is designed such that it has a known reference resonance frequency, f, that corresponds to a known reference length, L, of the antenna array.

7. The system of claim 6, wherein each patch is identically sized and has a resonant length, A, which is half a substrate wavelength ($\lambda s/2$) and wherein the plurality of patch antennas are electrically connected to the feeding line by a respective matching section having a length C, which is a quarter of the substrate wavelength ($\lambda s/4$).

8. The system of claim 1, wherein the plurality of patch antennas in a given row are evenly spaced apart along the length of the row.

9. The system of claim 1, wherein the antenna array comprises a plurality of rows of patch antennas, wherein the patch antennas defining a given row are interconnected by a common feeding line and wherein the feeding lines of respective rows are interconnected.

10. The system of claim 1, wherein the antenna array is encapsulated within a protective material suitable for protection against harsh environments.

11. A system for measuring a volume of a storage container using a network analyzer, the system comprising:
    a plurality of measuring instruments configured to be deployed on an exterior wall of a cylindrical storage, wherein a given measuring instrument among the plurality of measuring instruments is extended circumferentially about the circumferential sidewall of the storage container at a respective height on the wall such that a length of the given measuring instrument corresponds to the circumference of the container at the respective height, and wherein the given measuring instrument includes:
a flexible elongate strap substrate having the length; and
a flexible antenna array extending substantially along the length of the strap substrate, wherein the antenna array is either affixed to a surface of the strap substrate or embedded within the strap substrate, whereby compression or extension of the strap substrate causes compression or extension of the antenna array, and wherein the antenna array comprises:
a plurality of interconnected patch antennas arranged in at least one row, wherein the plurality of patch antennas are electrically connected to a feeding line extending alongside the at least one row, and wherein the feeding line is configured to terminate in an impedance matched to the network analyzer such that the network analyzer can excite the antenna array with an input signal and measure electrical parameters relating to the antenna array's response to the input signal including a resonance frequency, and wherein the plurality of interconnected patch antennas comprising the antenna array is are configured such that the antenna array has reference electrical parameters that correspond to a reference length of the antenna array and the measured electrical parameters vary relative to the reference electrical parameters as a function of a change in the physical length of the antenna array during use relative to the reference length; and
a diagnostic computing system comprising:
a non-transitory computer readable storage medium,
a processor in electronic communication with the given measuring instrument and the computer readable storage medium,
one or more software modules comprising executable instructions stored in the storage medium, wherein the one or more software modules are executable by the processor and include:
an excitation module that configures the processor to, using the network analyzer connected to the antenna array, generate the input signal to excite the antenna array,
a parameter measurement module that configures the processor to, using the network analyzer, measure the electrical parameters relating to the antenna array's response to the input signal, and record the measured electrical parameters in the storage medium,
a parameter analysis module that configures the processor to calculate, based on the measured electrical parameters, a change in the electrical parameters relative to reference electrical parameters for the antenna array stored in the storage, wherein the reference electrical parameters for the antenna array correspond to a reference length of the antenna array and the strap substrate, and
a dimension analysis module that configures the processor to calculate a current length of the antenna array and the strap substrate based on the calculated change in electrical parameter and the reference length, and wherein the dimension analysis module further configures the processor to calculate the volume of the storage container based on the calculated length of the antenna array of each of the plurality of measuring instruments.

12. The system of claim 11, wherein the antenna array is encapsulated within a protective material suitable for protection against harsh environments.

13. A method of measuring an object using a measuring instrument, the method comprising:
providing a measuring instrument comprising:
a flexible elongate strap substrate having a length; and
a flexible antenna array extending substantially along the length of the strap substrate, wherein the antenna array is affixed to a surface of the strap substrate or embedded within the strap substrate, whereby compression or extension of the strap substrate causes compression or extension of the antenna array, and wherein the antenna array comprises:
a plurality of interconnected patch antennas arranged in at least one row, wherein the plurality of patch antennas are electrically connected to a feeding line extending alongside the at least one row, and wherein the feeding line is configured to be connected to a network analyzer,
wherein the patch antennas are arranged to provide an antenna array having a reference resonance frequency that corresponds to a reference length of the antenna array and the strap substrate, and wherein the antenna array is configured such that the resonance frequency of the antenna array varies relative to the reference frequency response as a function of changes in the length of the antenna array relative to the reference length; and
calibrating the length of the measuring instrument, the calibrating step including the steps of:
generating, with a network analyzer connected to the antenna array, an input signal that excites the antenna array,
measuring, with the network analyzer, a resonance frequency of the antenna array in response to the input signal,
calculating, with a diagnostic computing system, a change in the resonance frequency based on the measured resonance frequency relative to the reference resonance frequency, wherein the reference resonance frequency and corresponding reference length of the antenna array and strap substrate are stored in a database that is accessible to the diagnostic computing system, and
determining, with the diagnostic computing system, a current length of the antenna array and the strap substrate based on the measured change in resonance frequency and the reference length of the antenna array and the strap substrate.

14. The method of claim 13, further comprising:
deploying the measuring instrument on an exterior wall of a cylindrical storage container, wherein the measuring instrument is extended circumferentially about the circumferential wall of the storage container at a respective height such that the length of the measuring instrument corresponds to the circumference of the container at the respective height; and
calculating, with the diagnostic computing system, the volume of the storage container based on the calculated current length of the antenna array and strap substrate.

15. The method of claim 14, wherein the calibrating step is performed one or more of prior to and during deployment of the measuring instrument on the cylindrical storage container and further comprising:

updating the reference resonance frequency and reference length stored in the database according to the measured resonance frequency and the current length calculated during an initial calibrating operation; and periodically repeating the calibrating step and the step of calculating the volume of the storage container.

16. The method of claim 13, wherein the antenna array is encapsulated within a protective material suitable for protection against harsh environments.

* * * * *